UNITED STATES PATENT OFFICE 2,422,637

RESINOUS CONDENSATION PRODUCT OF
PHENOL AND STYRENE OXIDE

Charles A. Thomas, Dayton, Ohio, assignor to
Monsanto Chemical Company, St. Louis, Mo.,
a corporation of Delaware No Drawing. Application October 14, 1943,
Serial No. 506,265

4 Claims. (Cl. 260—18)

The present invention relates to synthetic, oil-soluble resins, more particularly to resins obtained by condensation of phenols with aralkylene oxides, to methods of producing the same and to improved coating compositions.

According to the invention new, oil-soluble resins are made by condensation of phenols with aralkylene oxides having the general formula:

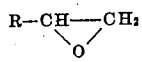

wherein R stands for a substituted or unsubstituted phenyl or naphthyl radical. Illustrative of aralkylene oxides having the above general formula may be mentioned styrene oxide; nuclearly alkyl substituted styrene oxides such as ortho-, meta- or para-methylstyrene oxide, ortho-, meta- or para-ethylstyrene oxide, ortho-, meta- or para-isopropylstyrene oxide or ortho-, meta- or para-tert-butylstyrene oxide; nuclearly halogenated styrene oxides such as ortho-, meta- or para-chlorostyrene oxide or ortho-, meta-, or para-fluoro-styrene oxide; ortho-, meta- or para-aminostyrene oxide; ortho-, meta- or para-nitrostyrene oxide; ortho-, meta- or para-hydroxystyrene oxide; ortho-, meta- or para-cyanostyrene oxide; nuclear alkoxy styrene oxides such as ortho-, meta- or paramethoxystyrene oxide, ortho-, meta- or para-ethoxystyrene oxide or ortho-, meta- or para-propoxystyrene oxide; nuclearly arylated styrene oxides such as ortho-, meta- or para-phenyl-styrene oxide and compounds in which the nuclear aryl substituent is further substituted such as para-(para-hydroxyphenyl) styrene oxide or para-(ortho-aminophenyl) styrene oxide; aralkylene oxides containing condensed ring nuclei such as alpha-naphthylethylene oxide, beta-naphthylethylene oxide, beta-hydroxy-alpha-naphthylethylene oxide, alpha-chloro-beta-naphthylethylene oxide, alpha-methyl-beta-naphthylethylene oxide, etc.

As phenols which may be condensed with the above mentioned aralkylene oxides for the production of my new resins may be mentioned phenol and the alkyl or aryl derivatives thereof such as ortho-, meta- or para-cresol, technical mixtures of the cresols such as meta-para-cresol; the xylenols such as 1,3,5-xylenol or technical mixtures thereof; the higher alkylated phenols such as meta- or para-ethylphenol, meta- or para-isopropylphenol, meta- or para-isobutylphenol, meta- or para-tert-butylphenol, meta- or para-tert-amylphenol, meta- or para-isohexylphenol, meta- or para-2-ethylhexylphenol; the nuclearly aryl-substituted phenols such as para-phenylphenol, meta-phenylphenol, para-(para-methylphenyl)phenol, para-(meta-chlorophenyl)phenol or para-(para-hydroxyphenyl) phenol; the polyhydric phenols such as resorcinol, hydroquinone, pyrogallol, pyrocatechol, phloroglucinol, hydroxyhydroquinone and the partially etherified derivatives thereof such as resorcinol monoethyl ether or phloroglucinol dimethyl ether or guaiacol; further, alpha-naphthol, beta-naphthol, alpha-methyl-beta-naphthol, the bis(hydroxyphenyl) alkanes obtained by condensation of phenols with ketones or aldehydes such as bis-(para-hydroxyphenyl) dimethylmethane, etc.

The reaction of the above mentioned phenols with an aralkylene oxide of the class herein defined takes place readily, in the presence of acidic or basic catalysts, either at ordinary or elevated temperatures, the temperature and the reaction time being suited to the nature of the individual reactants, and the quantities and qualities desired in the final product. While reaction is apparent even at room temperature, or slightly elevated temperatures, I prefer to operate at temperatures varying from about 120° C. to about 225° C. in the absence of catalysts. Valuable resinous materials are obtainable by initiating the reaction at a temperature corresponding to the boiling point of the phenol employed and in practice I prefer to operate as follows:

I heat the phenolic constituent, alone, to its boiling point, and gradually add to it, with stirring, a quantity of an aralkylene oxide which is equivalent to, say, from 50% to 200% by weight of the phenol. The phenol and aralkylene oxide may be employed in widely varying proportions, however, somewhat better results are obtained within the proportions indicated. Under these conditions the reaction is quite vigorous and condensation is completed upon the addition of the total amount of the aralkylene oxide which is to be employed, i. e., generally in from about 1 to 4 hours, depending upon the reaction quantities and temperatures employed. More rapid addition of the aralkylene oxide to the phenol sometimes results in too vigorous a reaction, in which case it may be necessary to control the condensation by applying cooling fluids to the reaction vessel. While the desired resin is usually obtainable at the end of the reaction by simply cooling the reaction mixture and allowing the product to harden, in some cases it may be necessary to vacuum-distil or steam-distil the reaction mixture in order to separate residual amounts of unreacted phenol or oxide. A convenient way to form the resin is to condense the aralkylene oxide with an excess of phenol, thus employing phenol as a solvent in which the reaction is carried out. At the completion of the reaction, the free phenol associated with the resin may be removed by distillation.

Instead of removing the excess of any unreacted material, it may subsequently be combined with any resin forming substance such as formaldehyde, acetaldehyde (in the case of unreacted phenols) or with resin acids or fatty acids (in case unreacted aralkylene oxide is present).

When an excess of phenol (present in the styrene-oxide-phenol reaction product) is reacted with an aldehyde such as formaldehyde, the resinous composition so formed is oil-soluble, which is surprising considering the fact that phenol-formaldehyde resins per se are not soluble in oils.

The resinous products obtained by condensation of aralkylene oxides with phenols are clear, hard, brittle, thermosetting resins which vary in color from a light yellow to dark red or brown. The present aralkylene oxide-phenol resins are highly valuable as resinous basis for the formulation of coating compositions such as paints, varnishes and enamels. When processed with drying oils such as tung oil or oiticica oil and admixed with the usual thinners and driers, there are obtained varnishes which dry very rapidly, usually within a time of 1 hour, to yield clear, light-colored films of good flexibility and water resistance. Films obtained from such varnishes possess extremely good weathering properties. For example, roof tests in Southern Ohio has shown that a varnish prepared from a styrene-oxide phenol resin and tung oil gives a hard, glossy film that appears substantially unchanged after being exposed for two years.

While the present resins are of most interest in the coatings industry, they may be used as molding resins as well as in other fields where oil-soluble resins find particular application.

The invention is illustrated, but not limited, by the following example:

*Example*

28 grams (0.3 mol) of phenol was heated to boiling and then, over a period of about 30 minutes, 24 grams (0.2 mol) of styrene oxide was gradually added, with stirring. During the addition the temperature of the reaction mixture was maintained at from 150° C. to 180° C. and the reaction mixture became increasingly viscous. The product solidified to a dark, clear, brittle resin upon cooling. Removal of reaction water and excess phenol was effected by distilling the reaction mixture to an oil-bath temperature of approximately 185° C. at about 100 mm. of mercury pressure. There was thus obtained a hard, clear, amber-colored resin which had a softening point of 90° C. and flowed at a temperature of 130° C. When immersed in distilled water for 48 hours no change was undergone by the resin. Immersion of the resin in a 5% aqueous solution of sodium hydroxide for 48 hours also had no effect on the resin. The styrene oxide-phenol resin was insoluble in mineral spirits but soluble in xylene, dioxane and vegetable oils. Films cast from xylene solutions of the resin dried without residual tackiness.

The present resin was formulated into a varnish in the following manner: A mixture consisting of 12.5 grams of the resin and 30 grams of tung oil was processed to a temperature of 555° F. and then maintained at a temperature of 500° F. for 7 minutes. Upon addition of 25 grams of mineral spirits, 15 grams of xylene and a small amount of a lead-cobalt drier there was obtained a clear, homogeneous varnish which, when used as a coating on wood, dried in 1 hour to give hard, flexible films of good color and water-resistance. In order to test the weather-resistance of this varnish, wood panels were coated with it and subjected to roof-exposure in Dayton, Ohio. Examinations of the test-panels were made at intervals and it was shown that at the end of 17 months there was no checking of the film and that it remained glossy and substantially unchanged. At the end of 24 months, the film was still in excellent condition. On the other hand, a film obtained from a varnish which had been similarly formulated from an oil-soluble polystyrene showed checking at the end of 10 months, was dulled by the end of 17 months, and had failed completely at the end of 22 months.

Although the above example shows the condensation of phenol with styrene oxide in the absence of a catalyst, various condensation agents, usually employed in phenol-aldehyde condensations, may be used in the practice of my invention. These agents include caustic soda, ammonia, zinc oxide, mineral acids, organic acids, any alkaline or acid salt, etc. Such condensing agents may be advantageously employed when it is desired to vary the nature of the resinous material in order to fit it to a particular purpose. Condensing agent may also be employed to advantage when working with some of the substituted styrene oxides, which may be less reactive than styrene oxide, or when working with some of the higher phenols, especially those carrying substituents in the ortho- and para-positions. The reaction may be conducted in the presence or absence of a solvent or diluent, such materials being necessary when either or both of the reactants are solid at ordinary temperatures.

In the production of my new phenolic resins, styrene oxide and the other aralkylene oxides which are herein defined appear to function somewhat as does the aldehydic component in the preparation of phenol-aldehyde resins. The invention is, therefore, of general applicability to the production of resinous masses by condensation of one or more of the present aralkylene oxides with one or more aromatic compounds containing at least one hydroxy group.

Other resinous materials can be included with the aralkylene oxide-phenol resins, either by addition to the raw ingredients or by incorporation with the finished product. During the condensation of the aralkylene oxide with the phenol or to the resulting product there may be added various amounts of, for example, such natural gums or resins as copal, gum elemi or colophony or derivatives thereof such as the rosin-glycerine esters; drying oils, alkyd resins or components thereof such as glycerine-phthalic anhydride resins or the glycerine-maleic anhydride resins; vinyl resins such as the styrene resins or the copolymers of styrene, the polyvinyl acetals or other known oil-soluble vinyl type resins; oil-soluble phenolic resins such as the para-tert-butylphenol-formaldehyde resin or the para-phenylphenol-formaldehyde resin; certain urea-aldehyde resins, melamine-aldehyde resins, etc. However, in most instances, the addition of such resins or the raw material ingredients thereof to the present products is generally of little advantage with respect to enhancing either the drying properties or the weather-resistance or the oil-solubility thereof and care must be employed in selecting an additive which will not decrease, rather than increase, the desirable properties of the present resins. On the other hand, addition of one of the aralkylene oxide-phenol resins even in very small amounts to other resinous materials is generally instrumental in imparting some of the good properties of the present materials. For example, the styrene oxide-phenol resin has been found to accelerate the curing time of Butvar (a polyvinyl butyral resin) when added to the latter in small quantities. Thus valuable coating compositions are compounded by combining styrene oxide-phenol resin with polyvinyl butyral resin.

While the above example shows the preparation of a varnish by processing an aralkylene oxide-phenol resin with tung oil, other fatty oils, both drying, semi-drying and non-drying, are also solvents for these condensation products. As examples of such oils may be mentioned linseed oil, rape seed oil, castor oil, perilla oil, cottonseed oil, soya bean oil, corn oil, fish oil, etc. When incorporated into vehicles containing relatively large proportions of linseed oil, i. e., into a long-oil varnish, they have an accelerating effect on the drying time. For example, a 30-gallon varnish obtained from styrene oxide-phenol resin and linseed oil has a drying time of from 2 to 2.5 hours, whereas linseed oil varnishes from two different para-tert-butylphenol-formaldehyde resins did not dry within 4 hours and 18 hours, respectively. The drying time of a varnish prepared from a styrene oxide-phenol resin and Conjulin (an isomerized linseed oil) was also much lower than the drying time of a varnish from para-tert-butylphenol and Conjulin.

Advantageously the heat-reaction whereby the resin is combined with the oil is carried out in a non-oxidizing atmosphere, that is, in an atmosphere of carbon dioxide or nitrogen.

The use of resins of this invention thus makes possible the production of varnishes containing large amounts of linseed oil which dry rapidly even when the drier content of the same is lower than that which is customarily employed with vehicles having a large linseed oil content. The very good weather-resisting properties of films obtained from varnishes prepared from my new phenolic resins, combined with low drying time, high gloss and good water- and alkali-resistance makes it apparent that the provision of my new products constitutes a definite improvement in the art.

Although the utility of the present resins is particularly marked in the preparation of drying oil compositions, i. e., in the manufacture of varnishes and enamels, they also find application in other fields. Molded, laminated and impregnated articles, as well as coating compositions, in presence or absence of oils, may be made from the aralkylene oxide-phenol resins. For example, the resins may be admixed with fillers such as wood flour, asbestos, ground nut-shell, abrasives or other granular material and heated under pressure by customary heat molding procedure to obtain molded rigid articles of great density, mechanical strength and chemical resistance. Either alone or admixed with oils, the present resins are also useful for the production of friction materials suitable for use as clutch facings, brake blocks, brake linings and friction belts for pulleys. They serve as wear-resistant and substantially water-proof binders in the manufacture of linoleum, abrasives, etc. In bonding plywoods, they give a product of great strength and unusual resistance to moisture, decay and weathering. They are also advantageously employed in the manufacture of printing inks.

While this invention has been described in connection with certain illustrated embodiments thereof, it is to be understood that this has been done merely for the purpose of affording illustrations thereof, and that the scope of this invention is to be limited only by the following claims.

What I claim is:

1. A resinous product comprising the heat reaction product of styrene oxide and phenol combined with a polyvinyl butyral resin.

2. The resinous condensation product formed by heating phenol together with from 50% to 200% by weight thereof of styrene oxide.

3. A coating composition comprising a fatty drying oil and as a constituent thereof the resinous condensation product formed by heating phenol together with from 50% to 200% by weight thereof of styrene oxide.

4. The process for producing a resin which comprises adding styrene oxide to heated phenol until from 50% to 200% by weight based on phenol of styrene oxide has been added.

CHARLES A. THOMAS.

REFERENCES CITED

The following references are of record in the file of this patent:

UNITED STATES PATENTS

| Number | Name | Date |
|---|---|---|
| 2,167,073 | Herstein | July 25, 1939 |
| 2,213,477 | Steindorff et al. | Sept. 3, 1940 |
| 2,060,410 | Balle | Nov. 10, 1936 |
| 2,131,120 | Schlack | Sept. 27, 1938 |